US012537245B2

(12) United States Patent
Gao

(10) Patent No.: US 12,537,245 B2
(45) Date of Patent: Jan. 27, 2026

(54) ENERGY STORAGE UNIT WITH INTEGRATED TWO-PHASE COOLING

(71) Applicant: Baidu USA LLC, Sunnyvale, CA (US)

(72) Inventor: Tianyi Gao, San Jose, CA (US)

(73) Assignee: BAIDU USA LLC, Sunnyvale, CA (US)

(*) Notice: Subject to any disclaimer, the term of this patent is extended or adjusted under 35 U.S.C. 154(b) by 945 days.

(21) Appl. No.: 17/691,314

(22) Filed: Mar. 10, 2022

(65) Prior Publication Data

US 2023/0291031 A1 Sep. 14, 2023

(51) Int. Cl.
*H01M 10/6568* (2014.01)
*H01M 10/627* (2014.01)
*H01M 10/6569* (2014.01)
*H01M 10/658* (2014.01)
*H05K 7/20* (2006.01)

(52) U.S. Cl.
CPC ... *H01M 10/6568* (2015.04); *H01M 10/6569* (2015.04); *H01M 10/658* (2015.04); *H05K 7/203* (2013.01); *H05K 7/20318* (2013.01); *H01M 10/627* (2015.04)

(58) Field of Classification Search
None
See application file for complete search history.

(56) References Cited

U.S. PATENT DOCUMENTS

| 2014/0097797 | A1* | 4/2014 | Hendrix | H01M 10/4207 320/118 |
| 2014/0377623 | A1* | 12/2014 | Pyzza | H01M 10/61 165/172 |
| 2017/0005380 | A1* | 1/2017 | Harris | F28D 15/02 |
| 2018/0343770 | A1* | 11/2018 | Brink | H01L 23/44 |
| 2020/0403283 | A1* | 12/2020 | Gao | H05K 7/20309 |
| 2021/0066767 | A1* | 3/2021 | Gao | H01M 10/613 |

FOREIGN PATENT DOCUMENTS

| GB | 2584287 A | * 12/2020 | H01M 50/204 |
| KR | 20130020449 A | * 2/2013 | H01M 10/63 |

* cited by examiner

Primary Examiner — Ula C Ruddock
Assistant Examiner — Maria F Orozco
(74) Attorney, Agent, or Firm — WOMBLE BOND DICKINSON (US) LLP

(57) ABSTRACT

Embodiments are disclosed of an energy storage unit. The unit includes a battery housing and a battery stack positioned in the battery housing. The battery stack includes N vertically stacked battery packs, N≥2, and the N battery packs include at least a bottom battery pack and a top battery pack. N fluid channels formed in the battery housing, with each fluid channel fluidly coupled to a corresponding battery pack and extending vertically from its corresponding battery pack to the top of the battery housing. A condenser is positioned at the top of the battery housing and is fluidly coupled to the N fluid channels, so that vapor from each battery pack flows through the battery pack's corresponding fluid channel to the condenser and liquid condensed by the condenser return to the channels of corresponding battery pack.

18 Claims, 8 Drawing Sheets

ENERGY STORAGE UNIT WITH INTEGRATED TWO-PHASE COOLING

TECHNICAL FIELD

The disclosed embodiments relate generally to two-phase information technology (IT) cooling systems and in particular, but not exclusively, to an energy storage unit with integrated two-phase cooling.

BACKGROUND

Modern data centers like cloud computing centers house enormous amounts of information technology (IT) equipment such as servers, blade servers, routers, edge servers, power supply units (PSUs), battery backup units (BBUs), etc. These individual pieces of IT equipment are typically housed in racks within the computing center, with multiple pieces of IT equipment in each rack. The racks are typically grouped into clusters within the data center.

The main power source for IT equipment is generally a facility power source, such as electricity provided to the data center by an electrical utility. BBUs, as their name implies, are intended to provide backup power to IT equipment in a rack when the main power source fails or must be taken offline for maintenance. When the BBU is providing power to the IT equipment in the rack, energy storage units in the BBU, e.g. batteries, are discharging. When they are not providing power to the IT equipment in the rack the batteries are either idle or are being charged by the main power source. Charging and discharging the batteries generates heat, meaning that at times batteries in a BBU can require cooling. Battery heating becomes more problematic as the power consumption of IT equipment in the rack increases: higher energy consumption requires a higher battery discharge rate that generates more heat, and faster battery charging similarly generates more heat. Existing cooling solutions for battery packs rely in air cooling or liquid cooling, but these solutions might not enable high power density and high packaging densities. In addition, there is currently no available design for battery cells with two-phase coolant for data center applications.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1A is an exploded front view or a side view, FIG. 1B a top view of the battery housing.

FIG. 2A is a front view, FIG. 2B is a side view with the condenser in its closed position, and FIG. 2C is a side view with the condenser in its open position.

DETAILED DESCRIPTION

Figure 1A:
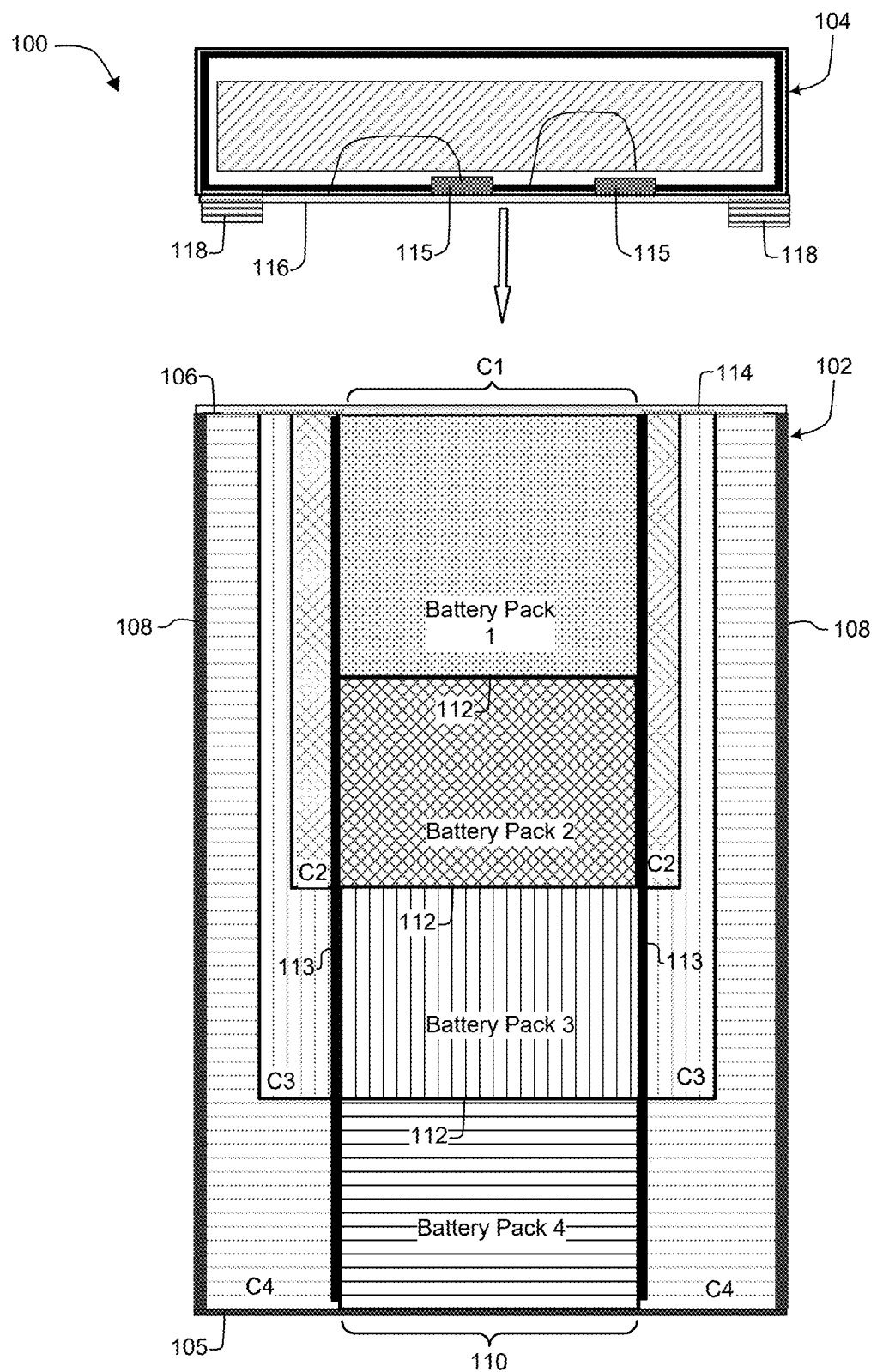
FIGS. 1A-1B are views of an embodiment of an energy storage unit configured for two-phase cooling.

Embodiments are described of an energy storage apparatus and system with integrated two-phase cooling for use with information technology (IT) equipment in an IT container such as an IT rack. Specific details are described to provide an understanding of the embodiments, but one skilled in the relevant art will recognize that the invention can be practiced without one or more of the described details or with other methods, components, materials, etc. In some instances, well-known structures, materials, or operations are not shown or described in detail but are nonetheless encompassed within the scope of the invention.

Reference throughout this specification to "one embodiment" or "an embodiment" means that a described feature, structure, or characteristic can be included in at least one described embodiment, so that appearances of "in one embodiment" or "in an embodiment" do not necessarily all refer to the same embodiment. Furthermore, the particular features, structures, or characteristics may be combined in any suitable manner in one or more embodiments. As used in this appli-cation, directional terms such as "front," "rear," "top," "bottom," "side," "lateral," "longitudi-nal," etc., refer to the orientations of embodiments as they are presented in the drawings, but any directional term should not be interpreted to imply or require a particular orientation of the described embodiments when in actual use.

The disclosed embodiments are systems for two-phase cooling energy storage units. The disclosed embodiments use a two-phase fluid recirculation and management system for thermal management, using two-phase coolants to solve high power density applications and corresponding challenges associated with two-phase immersion cooling. The disclosed embodiments are packaging designs for energy storage units that includes multiple cells, such as lithium-ion battery cells, for servers and server clusters. The disclosed embodiments aim to provide an efficient thermal management system for energy storage units deployed in different scales in data centers.

In addition, the disclosed embodiments enable some or all of the following benefits:

High power density energy unit thermal management.
High efficiency two-phase cooling for energy storage units using battery cells.
Efficient vapor management and leakage containment.
Accommodate different server and IT systems.
Enhancing cell performance and lifetime.
Preventing cell degradation.
Ease of implementation.
Ease of service and maintenance.
Accommodate different scales.

The disclosed embodiments include a battery pack hardware package and IT container which enables efficient two-phase cooling of battery cells in a battery pack with superior vapor management. The disclosed embodiments include several battery packs, and each has a dedicated channel and vapor outlet. Vapor generated in different cell regions are separated. The IT enclosure includes a distribution unit which is used for assembling one or more condensers. The condensers include a sealing edge for sealing with the edge on the top of the battery pack housing. The condenser includes flexible hoses with connectors. In one embodiment, the condenser can rotate between an open position and a closed position. In the closed position, the condensing unit is attached on top of the battery pack to form a contained region. In the open position, battery packs can be populated in the battery pack housing.

In one aspect, an energy storage unit includes a battery housing having a bottom, a top, and a set of sidewalls, the top being vertically spaced apart from the bottom and the sidewalls extending from the top to the bottom. A battery stack is positioned in the battery housing. The battery stack includes N vertically stacked battery packs, wherein N>2, and the N battery packs include at least a bottom battery pack and a top battery pack. N fluid channels are formed in the battery housing, so that each fluid channel is fluidly coupled to a corresponding battery pack and extends vertically from its corresponding battery pack to the top of the battery housing. A condenser is positioned at the top of the battery housing and fluidly coupled to the N fluid channels, so that vapor from each battery pack flows through each battery pack's corresponding fluid channel to the condenser and liquid from the condenser flows through each fluid channel to the channel's corresponding battery pack.

In one embodiment the N fluid channels are formed between the battery stack and the sidewalls of the battery housing. In another embodiment N-1 fluid channels are formed between the battery stack and the sidewalls of the battery housing, and an Nth fluid channel corresponds to the top battery pack and is formed by a top surface of the top battery pack. In one embodiment each of the N-1 fluid channels has a cross-section that is substantially annular and in another embodiment each of the N-1 fluid channels is fluidly coupled to at least one lateral side of its corresponding battery pack. One embodiment further includes a thermal insulator positioned between each pair of battery packs and another embodiment further includes a pair of electrical buses running vertically up the side of the battery stack. In another embodiment the condenser is coupled to a mechanism that allows the condenser to move between an open position and a closed position. And in another embodiment the top of the battery housing has a sealing edge adapted to engage a corresponding sealing edge on the condenser, so that when the condenser is in the closed position the battery housing and the condenser form a sealed enclosure.

In another aspect, an information technology (IT) cooling system includes an IT enclosure having a lower portion filled with a two-phase immersion cooling fluid and an enclosure lid that engages with a tope part of the lower portion to form a sealed volume within the IT enclosure. One or more energy storage units and/or its respective embodiments, as described above, can be positioned in the IT enclosure and at least partially immersed in the two-phase immersion cooling fluid. In one embodiment, each condenser is positioned within the enclosure lid. Another embodiment can include a fluid distribution system positioned in the enclosure lid and fluidly coupled to the one or more condensers to circulate an external cooling fluid through the one or more condensers.

Figure 1C:
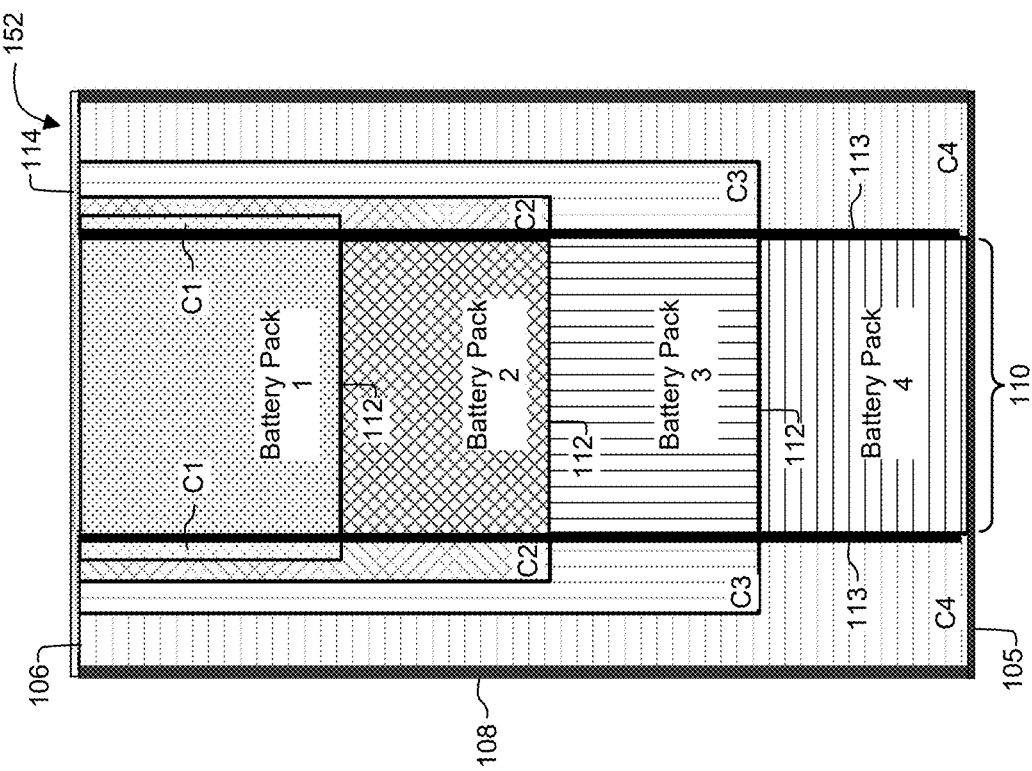
FIG. 1C is a side view of another embodiment of the battery housing.
Figure 1B:
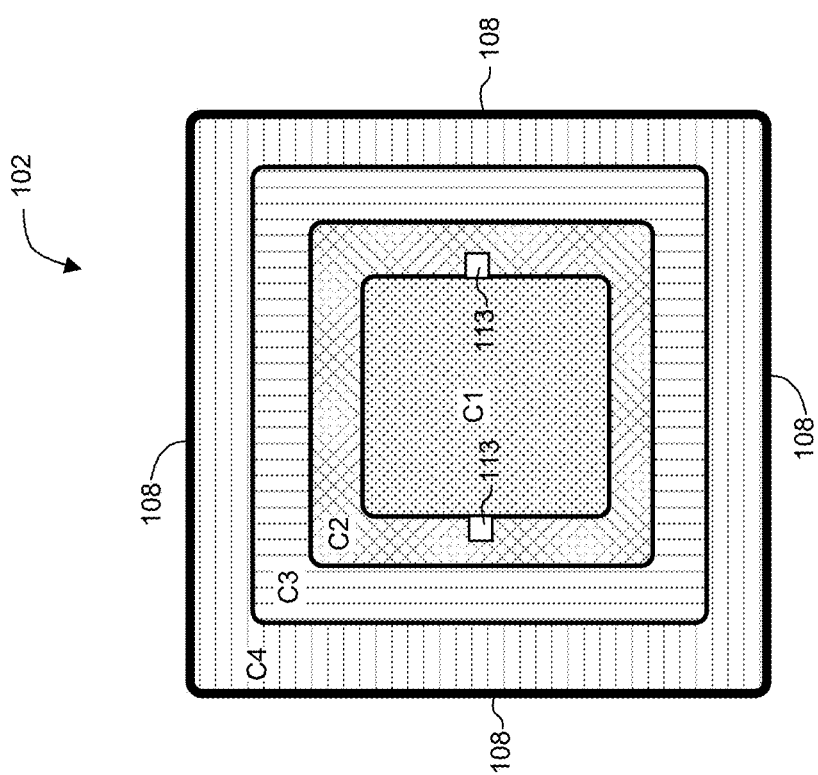

FIGS. 1A-1B together illustrate an embodiment of an energy storage unit 100 configured for two-phase cooling; FIG. 1A is an exploded side view, FIG. 1B a top view.

Energy storage unit 100 includes a battery housing 102 and a condenser 104. Battery housing 102 includes a bottom 105, a top 106, and sidewalls 108 that extend between bottom 105 and top 106. In the illustrated embodiment housing 102 has a quadrilateral cross-section (see, e.g., FIG. 1B) and therefore has four sidewalls 108, but in other embodiments housing 102 can have a different cross-sectional shape and a different number of sidewalls than shown.

A battery stack 110 is positioned within battery housing 102 and extends substantially from bottom 105 to top 106, although in other embodiments battery stack 110 need not extend the full distance between bottom 105 and top 106. Battery stack 110 includes N battery packs, with N≥2. In the illustrated embodiment N=4, but in other embodiment N can have a different value. With N≥2, battery stack 110 includes at least a top battery pack (battery pack 1 in the illustrated embodiment) at or near top 106 of battery housing 102 and a bottom battery pack (battery pack 4 in the illustrated embodiment) at or near bottom 105 of the battery housing. In one embodiment, individual battery packs in battery stack 110 are separated from each other by thermal insulators 112. A pair of conductive buses 113 run vertically up the side of battery stack 110 to conduct electricity from the battery packs to other components.

A plurality of fluid channels are formed in battery housing 102, with each fluid channel fluidly coupled to a corresponding battery pack. In the embodiment of FIG. 1A, one fluid channel C1 is formed by a top surface of battery pack 1, and three fluid channels C2-C3 are formed between battery stack 110 and sidewalls 108. Put differently, in the illustrated embodiment with N battery packs in the battery stack, N-1 channels fluid channels are formed between the battery stack 110 and sidewalls 108 and one fluid channel is formed by the top surface of the top battery pack. Other embodiments can have different configurations of fluid channels (see, e.g., FIG. 1C). Each fluid channel is fluidly coupled to a corresponding battery pack: battery pack 4 is fluidly coupled to fluid channel C4, battery pack 3 is fluidly coupled to fluid channel C3, battery pack 2 is fluidly coupled to fluid channel C2, and battery pack 1 is fluidly coupled to fluid channel C1. Fluid channels C2-C4 are fluidly coupled to the lateral sides of their corresponding battery packs, while fluid channel C1 is formed by the top surface of battery pack 1.

In the embodiment of FIGS. 1A-1B, fluid channels C2-C4 completely surround their corresponding battery packs, but another embodiment in other embodiments fluid channels C2-C4 need not completely surround their battery packs. In other embodiments, for instance, these channels can be formed on one, two, or three sides of their corresponding battery pack. In still other embodiments where the channels do not completely surround the battery pack, all channels need not be formed on the same side of the battery stack. In the illustrated embodiment, because fluid channels C2-C4 completely surround battery their corresponding battery packs they have an annular cross-sectional shape and are nested: channels C1-C3 are contained within channel C4, channels C1-C2 are contained within channel C3, and channel C1 is contained within channel C2. Moreover, fluid channels C1-C4 are concentric, meaning that they share the same center—or, put differently, all are centered on the same vertical axis. In other embodiments, for instance embodiment where the fluid channels do not completely surround their corresponding battery packs, fluid channels C1-C4 need not be concentric or nested. In one embodiment channel walls not formed by sidewalls 108 or battery stack 110 are formed with sheet metal, but other constructions are possible in other embodiments.

Condenser 104 is designed to be removably attached to top 106 of battery housing 102. Battery housing 102 includes a top edge 114 that sealingly engages with a corresponding edge 116 on the condenser, so that energy storage unit 100 becomes a sealed enclosure when the condenser is lowered onto the battery housing. The condenser includes a set of fluid connectors 115 which are connected with the cooling core through flexible hoses.

Figure 2A:
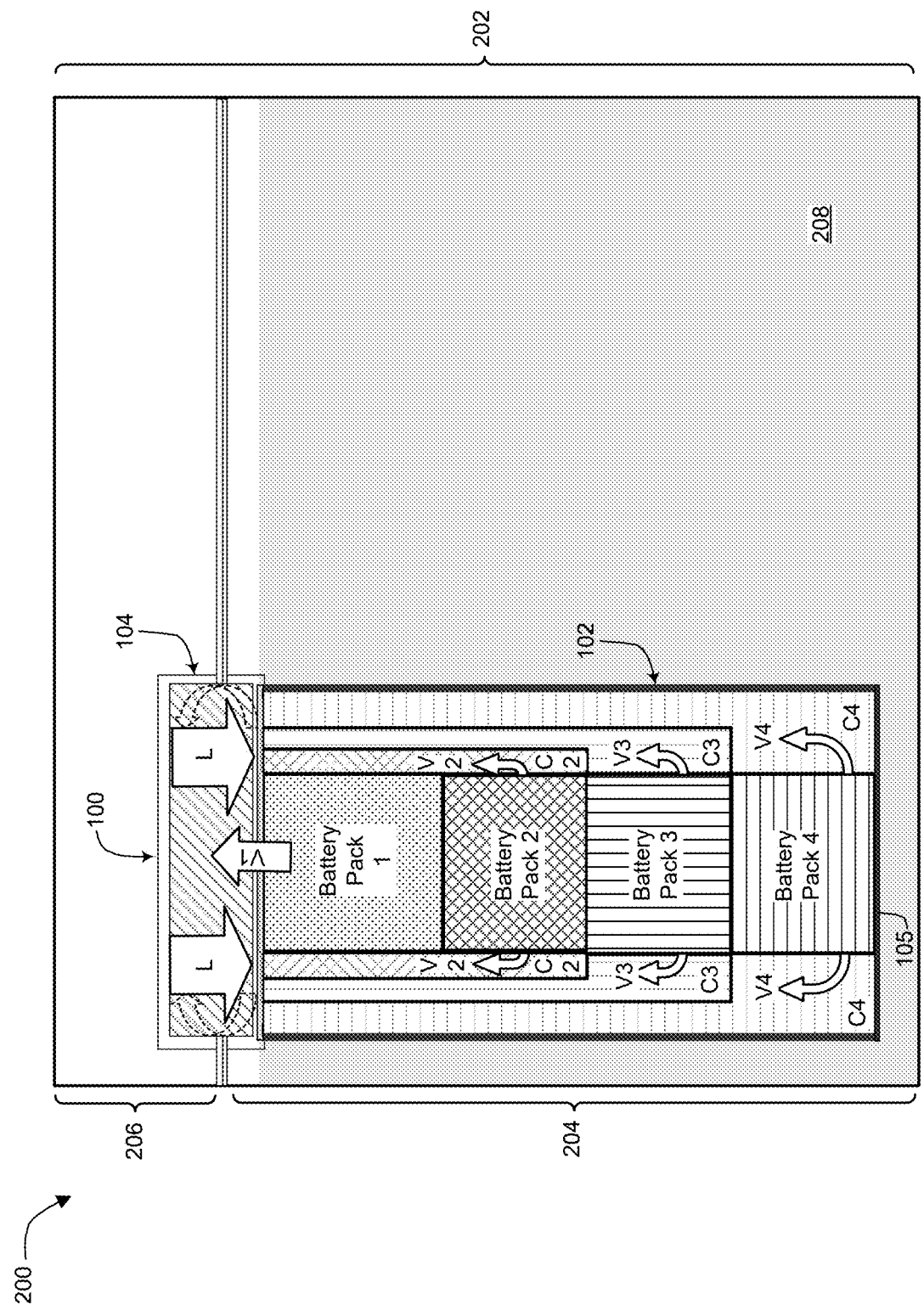
FIGS. 2A-2C are views of another embodiment of an energy storage unit configured for two-phase cooling.
Figure 2B:
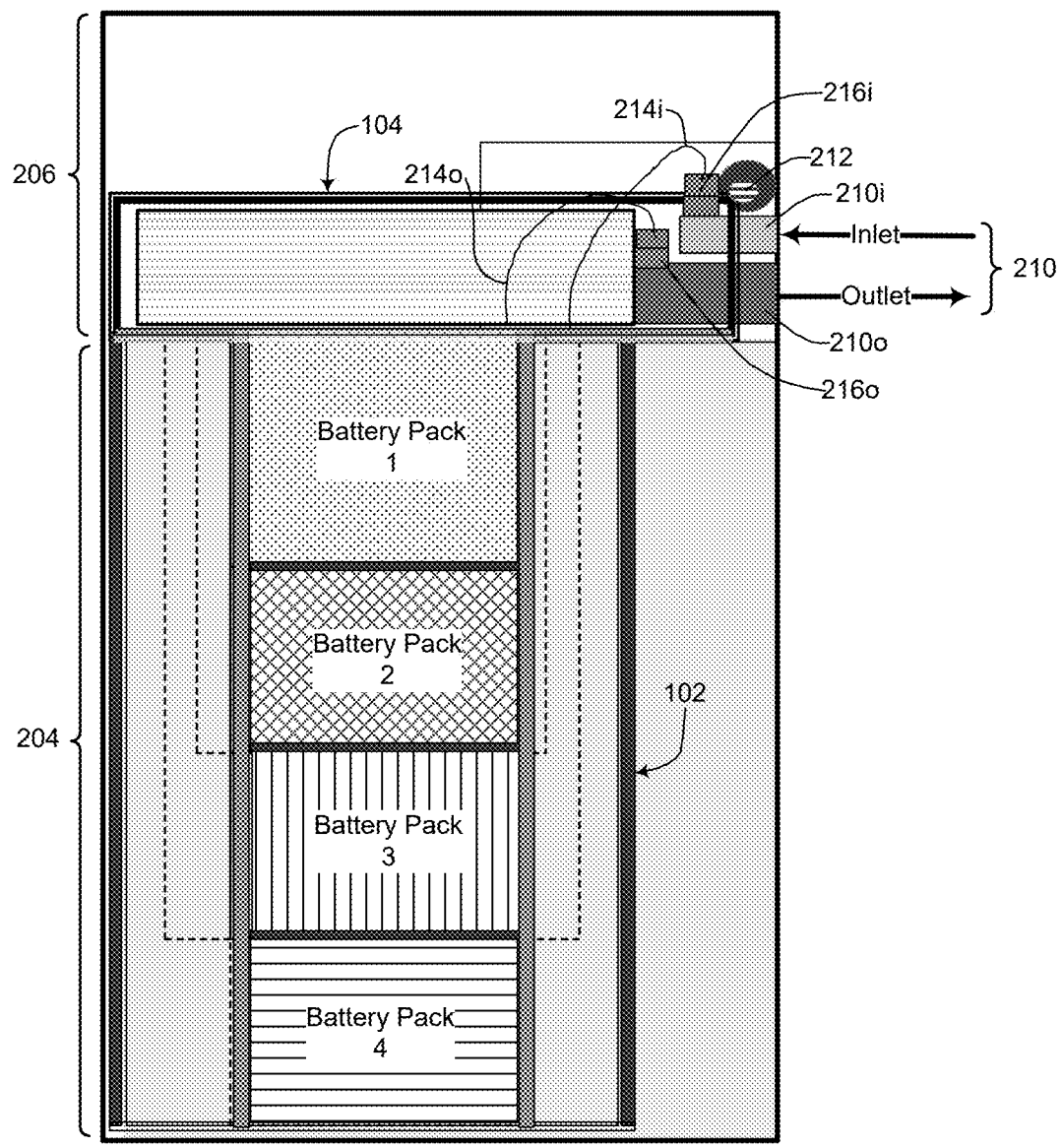
Figure 2C:
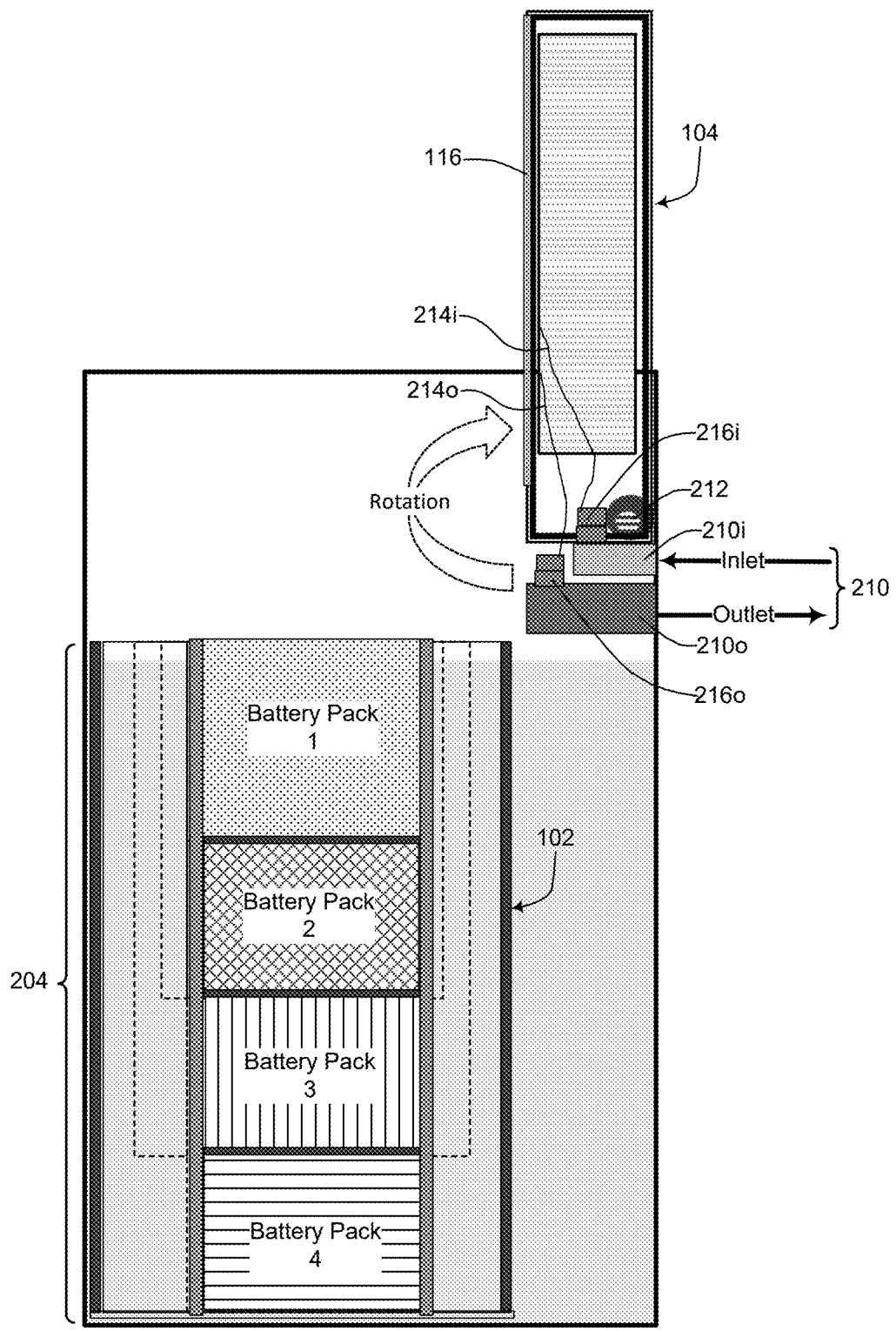

Connectors 115 can then be coupled to a source of external cooling fluid, so that the external cooling fluid can be circulated through the condenser (see, e.g., FIGS. 2B-2C). Condenser 104 can include one or more fittings 118 that engage with another element such as a hinge pin (see FIGS. 2B-2C, 3B) to facilitate movement of condenser 104 from an open position where it isn't engaged with top 106 to a [close] closed position where it is engaged with top 106. Operation of unit 100 is described below in connection with FIGS. 2A-2C.

FIG. 1C illustrates another embodiment of a battery housing 152. Battery housing 152 is in most respects similar to battery housing 102. The primary difference between battery housings 102 and 152 is the configuration of the fluid channels. Battery housing 102 has N fluid channels, one for each battery pack, but only N-1 of the fluid channels (C2-C4) are positioned between battery stack 110 and sidewalls 108 because the top battery pack (battery pack 1) uses its own top surface as its corresponding fluid channel C1. Battery housing 152 similarly has N fluid channels, but in battery housing 152 the top battery pack (battery pack 1), instead of using its own top surface as its corresponding fluid channel C1, has a fluid channel fluidly coupled to its side like the other battery packs. Put differently, in battery housing 152 all N fluid channels are positioned between battery stack 110 and sidewalls 108.

Figure 1D:
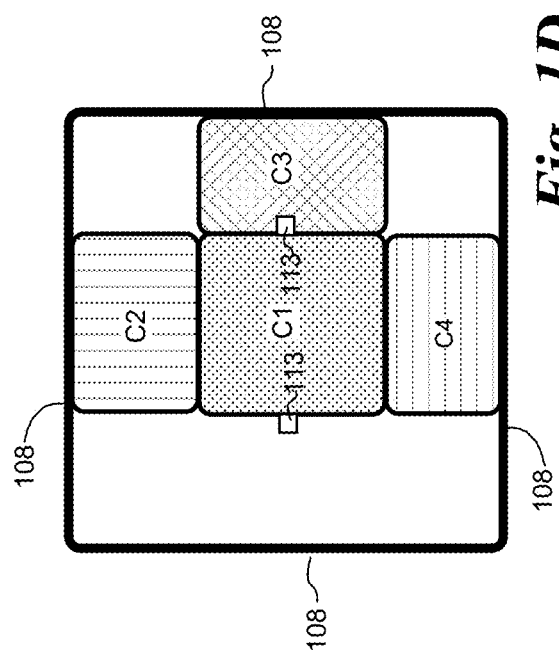
FIGS. 1D-1G are top views of battery housings with alternative embodiments of channel configurations.
Figure 1E:
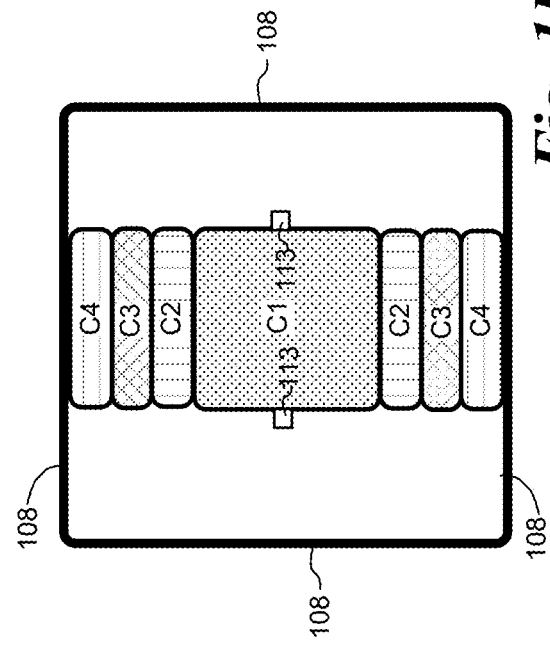
Figure 1F:
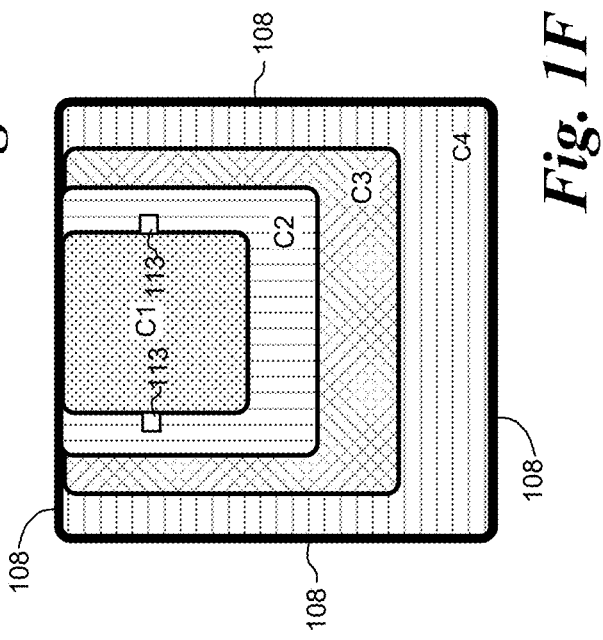
Figure 1G:
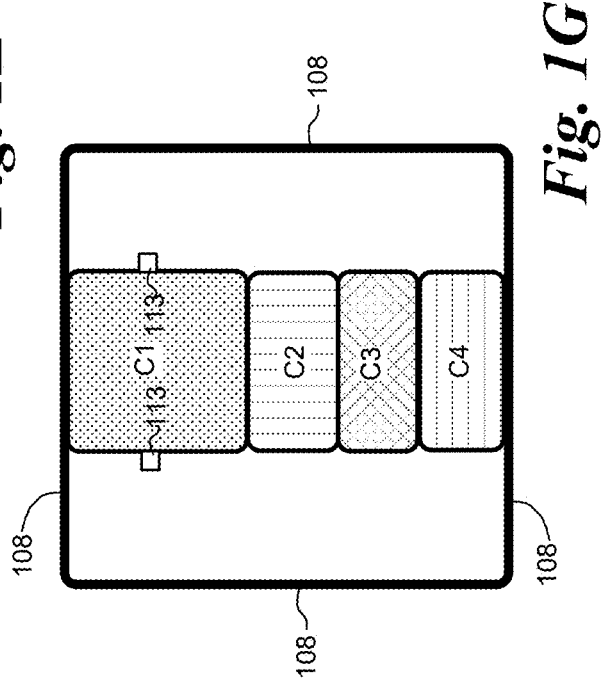

FIGS. 1D-1G illustrate alternative embodiments of channel configuration. In the embodiments of FIGS. 1A-1B, battery stack 110 is centered in battery housing 102 and channels C2-C4 surround the battery stack so that each channel is fluidly coupled to all four sides of its corresponding battery pack. But in other embodiments battery stack 110 need not be centered in the battery housing and each fluid channel need not be fluidly coupled to all four sides of its corresponding battery pack. FIG. 1D-1E illustrate embodiments in which each fluid channel is fluidly coupled to one side of its corresponding battery pack. In the embodiment of FIG. 1D, each of channels C2-C4 occupies the entire distance between the battery stack and sidewalls 108. In the embodiment of FIG. 1E each individual fluid channel C2-C4 occupies less than the entire distance between the battery stack and sidewalls, but channels C2-C4 together occupy the entire distance between the battery stack and sidewalls 108. FIGS. 1F-1G illustrate embodiments in which battery stack 110 is not centered in the battery housing. In the embodiment of FIG. 1F, each of channels C2-C4 is fluidly coupled to three sides of its corresponding battery pack, and the channels take up the entire space between the battery stack and the sidewalls. In the embodiment of FIG. 1G, each of channels C2-C4 is fluidly coupled to one side of its corresponding battery pack, and the channels take up the entire distance between the battery stack and the lower sidewall. Other embodiments can, of course, position the battery stack differently, fluidly couple the fluid channels to a different number of sides of their corresponding battery pack, and arrange the fluid channels differently than shown.

FIGS. 2A-2C together illustrate an embodiment of an IT immersion cooling system 200 including an energy storage unit 100. FIG. 2A is a front view, FIG. 2B a side view with the condenser in its closed position, FIG. 2C a side view with the condenser in its open position.

Immersion cooling system 200 includes an IT container 202 with two parts: a lower part 204 and a lid 206. Lower part 204 acts as a tank that is filled with a two-phase cooling fluid 208, and lid 206 attaches to the top of lower part 204. When lid 206 is attached to lower part 204, a seal is formed between the two to create a sealed volume within IT container 202. Two-phase cooling fluid 208 is expensive, so to help reduce or eliminate fluid loss due to vapor leakage, and to maintain the correct fluid level in lower part 204, a sealed volume is helpful. An energy storage unit 100 is positioned within IT container 202, with battery housing 102 partially or fully sub-merged in two-phase cooling fluid 208, so that battery packs 1-4 and their corresponding channels are fully filled with the liquid phase of two-phase cooling fluid 208. In one embodiment, a portion or all of bottom 105 of battery housing 102 can be perforated to allow the liquid phase of two-phase cooling fluid 208 to flow into the battery packs.

As best seen in FIGS. 2B-2C, condenser 104 extends into the interior of lid 206 and is fluidly coupled to an external coolant source by flexible fluid lines 214$i$ and 214$o$ by fluid lines 210 in the lid. More specifically, flexible fluid line 214$i$ is fluidly coupled to inlet line 210$i$ by a connector pair 216$i$, with one connector of the pair being fluidly coupled to inlet line 210$i$, the other connector of the pair being fluidly coupled to flexible fluid line 214$i$, and connectors 216$i$ being fluidly coupled to each other. Similarly, flexible fluid line 214$o$ is fluidly coupled to outlet line 210$o$ by a connector pair 216$o$, with one connector of the pair being fluidly coupled to outlet line 210$o$, the other connector of the pair being fluidly coupled to flexible fluid line 214$o$, and connectors 216$o$ being fluidly coupled to each other. Condenser 104 is also mechanically coupled to a fitting 212 (see FIGS. 2B-2C) about which it can rotate between a closed position in which it is sealed to battery housing 102 (see FIG. 2B) and an open position in which it is not sealed to the battery housing (see FIG. 2C). In one embodiment, condenser 104 can rotate through 90°, but in other embodiment it can rotate through different angles. In one embodiment fitting 212 can include a hinge pin and be coupled to a hinge, so that once installed condenser 104 can rotate about the hinge pin as shown in FIGS. 2B-2C. In other embodiments fitting 212 can be some other type of structure, for instance one that allows linear vertical motion of the condenser instead of rotation. Use of flexible fluid lines 214$i$ and 214$o$ allows unimpeded movement of condenser 104 about fitting 212, which in turn allows for easy access to the interior of the battery pack without the need to disconnect fluid lines, making it easier to access the battery packs for repair or replacement.

The operation of energy storage unit 100 is best illustrated in FIG. 2A. When one of more of the battery packs 1-4 is operating (i.e., charging or discharging) and thus generating heat, the heat from each operating battery pack heats the two-phase cooling fluid in the battery pack, changing it from its liquid phase L to its vapor phase V. The vapor phase V from each battery pack will flow into the battery pack's corresponding fluid channel: vapor V4 from battery pack 4 flows into fluid channel C4, vapor [C3] V3 from battery pack 3 flows into fluid channel C3, and so on. Vapor flowing into each channel bubbles upwardly through the liquid in each channel to condenser 104, which extracts heat from the vapor phase V and returns it to its liquid phase L. Liquid phase L then drops from the condenser downward onto the surface of the two-phase cooling fluid in each channel, thus completing a two-phase cooling loop. With the illustrated embodiment, then, the vapor from each battery pack is managed separately, so that vapor generated in one battery pack does not affect or have an adverse thermal impact on the others: vapor from battery pack 2 does not rise to or affect battery pack 1, vapor from battery pack 3 does not rise to or affect battery packs 1 or 2, and so on.

Figure 3A:
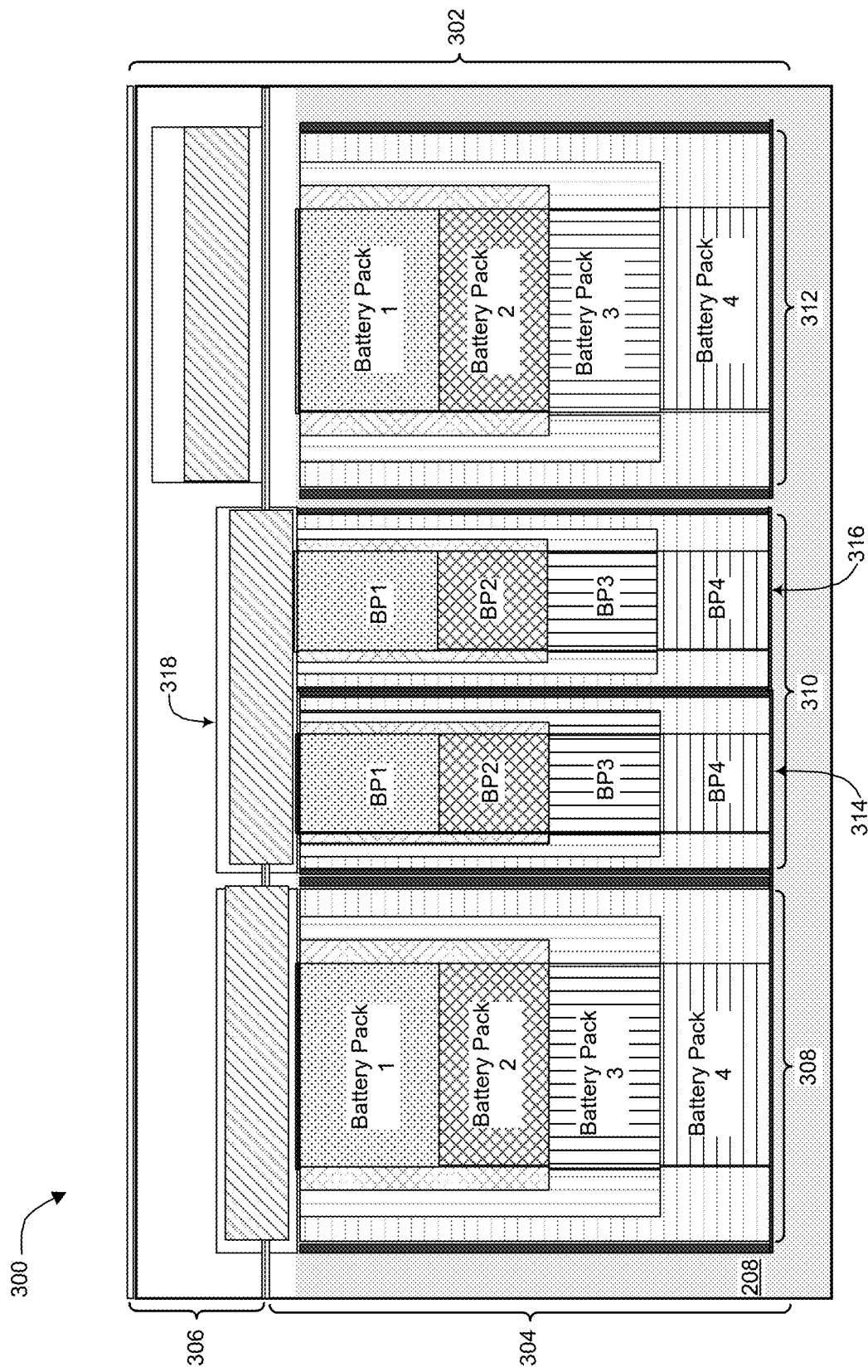
FIG. 3A is a front view of another embodiment of an information technology (IT) enclosure including multiple energy storage units configured for two-phase cooling.
Figure 3B:
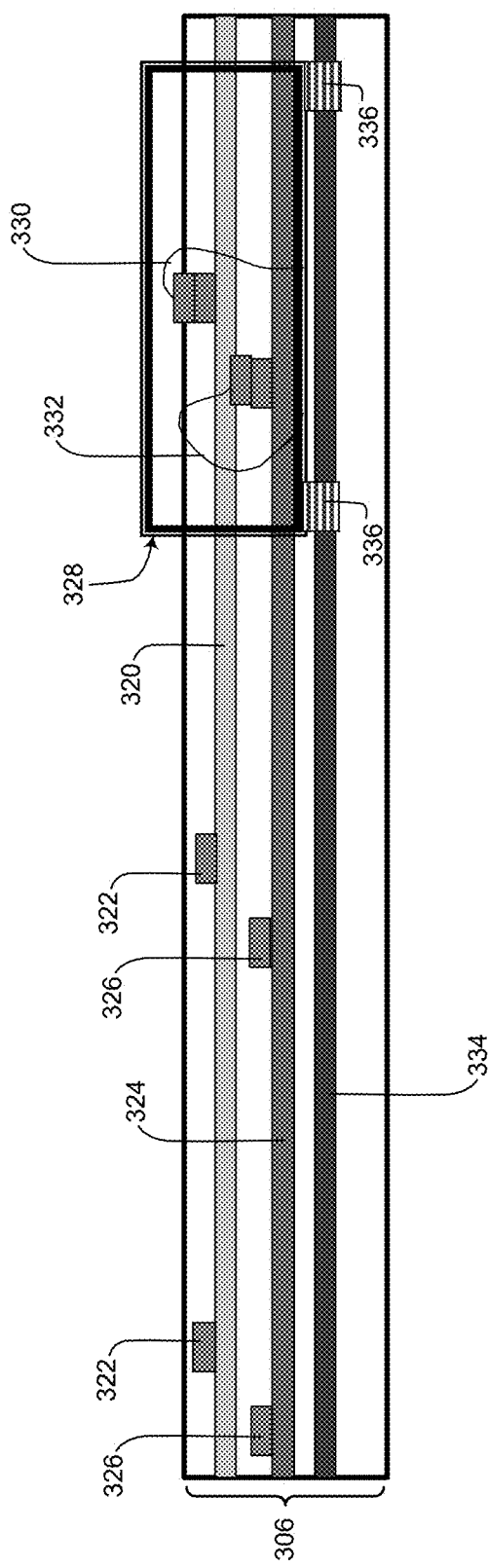
FIG. 3B is a front view of an embodiment of fluid distribution unit that can be used with an information technology (IT) enclosure of FIG. 3A.

9 Please replace paragraph with the following amended paragraph: FIGS. 3A-3B illustrate an embodiment of an IT immersion cooling system 300 including energy storage units. FIG. 3A illustrates the IT immersion cooling system and FIG. 3B illustrates an embodiment of an external cooling fluid distribution system.

IT immersion cooling system 300 is in most respects similar to IT immersion cooling system 100: it includes an IT container 302 with two parts: a lower part 304 and a lid 306. Lower part 304 acts as a tank that is filled with two-phase cooling fluid 208, and lid 306 attaches to the top of lower part 304. When lid 306 is affixed to lower part 304, a seal is formed between the lid and the lower part to create a sealed volume within IT container 302. The primary difference between IT immersion cooling systems 200 and 300 is that in system 300 IT container 302 is populated with more energy storage units and the energy units can be configured differently. IT immersion cooling system 300 includes multiple energy storage units-three energy storage units 308, 310, and 312 in this embodiment, although other embodiments can include more or less energy storage units than shown.

The battery housings and condensers of energy storage units 308 and 312 are configured similarly to the battery housings and condensers of energy storage unit 100 of FIG. 2A, and in energy storage units 308 and 312 there is a one-to-one correspondence between battery housing and condenser—i.e., each battery housing is coupled to its own single condenser. But energy storage unit 310 is configured differently, illustrating the flexibility of configurations and form factors that can be achieved. In energy storage unit 310, two battery housings 314 and 316 are configured similarly to battery housing 102, but in this energy unit both battery housings 314 and 316 share a condenser 318, so that there is a many-to-one correspondence between battery housings and condensers. In one embodiment condenser 318 is configured substantially like condenser 104, but in other embodiments it can be configured differently to accommodate multiple battery housings. Each of battery packs 308, 310, and 312 operates as described above for system 200.

FIG. 3B illustrates an embodiment of an IT enclosure lid 306 that includes external fluid connections to provide external cooling fluid to a single condenser, as shown in FIG. 2A, or multiple condensers, as shown in FIG. 3A. An inlet line 320 with one or more fluid connector 322 and an outlet line 324 with one or more fluid connectors 326 are positioned in the interior of lid 306. Generally, each fluid connector 322 on the inlet line will be paired with a corresponding fluid connector 326 on the outlet line, so that each pair of connectors can support inlet and outlet connections to a condenser, creating a fluid loop through which an external fluid can flow to enhance the condenser's ability to condense two-phase cooling fluid 208. A condenser 328 can be coupled to inlet line 320 and outlet line 324 using a pair of connectors 322 and 326. In one embodiment, condenser 328 is coupled to connectors 322 and 326 using flexible fluid lines 330 and 332 respectively.

Lid 306 also includes a structure 334 to which one or more individual condensers like condenser 328 can be movably coupled via structures 336 to allow each condenser to move between an open position and a closed position, as shown and described above for system 200 (see FIGS. 2A-2C). In one embodiment structure 334 can be a long hinge pin and structures 336 can be hinges, so that once installed the condensers can rotate about structure 334 as shown above for system 200. In other embodiments structure 328 can be some other type of structure, for instance one that allows linear vertical motion of the condensers instead of rotation.

Other embodiments are possible besides the ones described above. For instance:

The IT enclosure can be in different configurations.
The internal packaging and arrangement of cells can be in different.
The IT enclosure fluid recirculation design, including both the two-phase coolant and cooling fluid, can be different.

The above description of embodiments is not intended to be exhaustive or to limit the invention to the described forms. Specific embodiments of, and examples for, the invention are described herein for illustrative purposes, but various modifications are possible.

What is claimed is:

1. An energy storage unit comprising:
a battery housing having a bottom, a top, and a set of sidewalls, the top being vertically spaced apart from the bottom and the sidewalls extending from the top to the bottom;
a battery stack positioned in the battery housing, the battery stack including N vertically stacked battery packs wherein N>2 and the N battery packs include at least a bottom battery pack and a top battery pack;
N fluid channels formed in the battery housing, wherein each battery pack is fluidly coupled to a corresponding fluid channel that extends vertically from the battery pack to the top of the battery housing; and
a condenser positioned at the top of the battery housing and fluidly coupled to the N fluid channels, so that vapor from each battery pack flows through the battery pack's corresponding fluid channel to the condenser and liquid from the condenser flows through each battery pack's corresponding fluid channel back to the battery pack;
wherein at least N-1 of the N fluid channels are formed between the battery stack and the sidewalls and have a cross-section that is substantially annular and wherein the N fluid channels are nested and abutting.

2. The energy storage unit of claim 1 wherein the N fluid channels are formed between the battery stack and the sidewalls of the battery housing.

3. The energy storage unit of claim 1 wherein:
N-1 fluid channels are formed between the battery stack and the sidewalls of the battery housing; and
an Nth fluid channel corresponds to the top battery pack and is formed by a top surface of the top battery pack.

4. The energy storage unit of claim 3 wherein each of the N-1 fluid channels is fluidly coupled to at least one lateral side of its corresponding battery pack.

5. The energy storage unit of claim 1, further comprising a thermal insulator positioned between each pair of battery packs.

6. The energy storage unit of claim 1, further comprising a pair of electrical buses running vertically up the side of the battery stack.

7. The energy storage unit of claim 1 wherein the condenser is coupled to a mechanism that allows the condenser to move between an open position and a closed position.

8. The energy storage unit of claim 7 wherein the top of the battery housing has a sealing edge adapted to engage a corresponding sealing edge on the condenser, so that when the condenser is in the closed position the battery housing and the condenser form a sealed enclosure.

9. An information technology (IT) cooling system comprising:
- an IT enclosure including a lower portion filled with a two-phase immersion cooling fluid and an enclosure lid that engages with a top part of the lower portion to form a sealed volume within the IT enclosure;
- one or more energy storage units positioned in the IT enclosure and at least partially immersed in the two-phase immersion cooling fluid, each energy storage unit comprising:
  - a battery housing having a bottom, a top, and a set of sidewalls, the top being vertically spaced apart from the bottom and the sidewalls extending from the top to the bottom;
  - a battery stack positioned in the battery housing, the battery stack including N vertically stacked battery packs wherein N>2 and the N battery packs include at least a bottom battery pack and a top battery pack;
  - N fluid channels formed in the battery housing, wherein each battery pack is fluidly coupled to a corresponding fluid channel that extends vertically from the battery pack to the top of the battery housing; and
  - a condenser positioned at the top of the battery housing and fluidly coupled to the N fluid channels, so that vapor from each battery pack flows through the battery pack's corresponding fluid channel to the condenser and liquid from the condenser flows through each battery pack's corresponding fluid channel back to the battery pack;
  - wherein at least N-1 of the N fluid channels are formed between the battery stack and the sidewalls and have a cross-section that is substantially annular and wherein the N fluid channels are nested and abutting.

10. The IT cooling system of claim 9 wherein each condenser is positioned within the enclosure lid.

11. The IT cooling system of claim 10, further comprising a fluid distribution system positioned in the enclosure lid and fluidly coupled to the one or more condensers to circulate an external cooling fluid through the one or more condensers.

12. The IT cooling system of claim 10 wherein the N fluid channels are formed between the battery stack and the sidewalls of the battery housing.

13. The IT cooling system of claim 10 wherein:
- N-1 fluid channels are formed between the battery stack and the sidewalls of the battery housing; and
- an Nth fluid channel corresponds to the top battery pack and is formed by a top surface of the top battery pack.

14. The IT cooling system of claim 13 wherein each of the N-1 fluid channels is fluidly coupled to at least one lateral side of its corresponding battery pack.

15. The IT cooling system of claim 10, further comprising a thermal insulator positioned between each pair of battery packs.

16. The IT cooling system of claim 10, further comprising a pair of electrical buses running vertically up the side of the battery stack.

17. The IT cooling system of claim 10 wherein the condenser is coupled to a mechanism that allows the condenser to move between an open position and a closed position.

18. The IT cooling system of claim 17 wherein the top of the battery housing has a sealing edge adapted to engage a corresponding sealing edge on the condenser, so that when the condenser is in the closed position the battery housing and the condenser form a sealed enclosure.

* * * * *